(12) United States Patent
Tilton

(10) Patent No.: US 9,346,238 B2
(45) Date of Patent: *May 24, 2016

(54) FLEXIBLE PACKAGING COMPOSITES

(71) Applicant: Smart Planet Technologies, Inc., Newport Beach, CA (US)

(72) Inventor: Christopher R. Tilton, Laguna Hills, CA (US)

(73) Assignee: Smart Planet Technologies, Inc., Newport Beach, CA (US)

(*) Notice: Subject to any disclaimer, the term of this patent is extended or adjusted under 35 U.S.C. 154(b) by 29 days.

This patent is subject to a terminal disclaimer.

(21) Appl. No.: 14/065,205

(22) Filed: Oct. 28, 2013

(65) Prior Publication Data

US 2014/0057061 A1   Feb. 27, 2014

Related U.S. Application Data

(63) Continuation of application No. 12/193,577, filed on Aug. 18, 2008, now Pat. No. 8,569,411.

(60) Provisional application No. 60/956,690, filed on Aug. 18, 2007.

(51) Int. Cl.
| | | |
|---|---|---|
| B29D 22/00 | (2006.01) | |
| B32B 3/26 | (2006.01) | |
| B32B 27/20 | (2006.01) | |
| B32B 29/04 | (2006.01) | |
| B32B 1/02 | (2006.01) | |
| B32B 9/00 | (2006.01) | |
| B65D 75/00 | (2006.01) | |
| B32B 5/18 | (2006.01) | |
| B32B 5/30 | (2006.01) | |
| B32B 21/12 | (2006.01) | |
| B32B 3/28 | (2006.01) | |

(52) U.S. Cl.
CPC . *B32B 3/263* (2013.01); *B32B 1/02* (2013.01); *B32B 3/28* (2013.01); *B32B 5/18* (2013.01); *B32B 5/30* (2013.01); *B32B 9/002* (2013.01); *B32B 21/12* (2013.01); *B32B 27/20* (2013.01); *B32B 29/04* (2013.01); *B65D 75/008* (2013.01); *B32B 2262/062* (2013.01); *B32B 2262/067* (2013.01); *B32B 2264/104* (2013.01); *B32B 2307/412* (2013.01); *Y10T 156/10* (2015.01); *Y10T 156/1043* (2015.01); *Y10T 428/1334* (2015.01); *Y10T 428/24355* (2015.01); *Y10T 428/25* (2015.01); *Y10T 428/31645* (2015.04); *Y10T 428/31667* (2015.04)

(58) Field of Classification Search
CPC .................................. B32B 3/263; B32B 1/02
USPC ................................................ 428/35.2, 141
See application file for complete search history.

(56) References Cited

U.S. PATENT DOCUMENTS

| | | |
|---|---|---|
| 3,894,904 A | 7/1975 | Cook |
| 4,028,452 A | 6/1977 | Driscoll |
| 4,210,487 A | 7/1980 | Driscoll |
| 4,254,173 A | 3/1981 | Peer, Jr. |

(Continued)

FOREIGN PATENT DOCUMENTS

| | | |
|---|---|---|
| EP | 0326410 | 8/1989 |
| EP | 0811508 | 10/1997 |

(Continued)

*Primary Examiner* — Hannah Pak
(74) *Attorney, Agent, or Firm* — Fish & Tsang LLP

(57) ABSTRACT

The flexible packaging composites include one or more mineral-containing layers with a bonding agent. The composite structure is used as a primary or secondary packaging container or insulating material. In addition to the mineral-containing layer, the composite can contain one or more non-mineral containing layers, including various combinations of extruded resins, cast or blown films, and fibers. The mineral-containing layer is substantially and continuously bonded to the other layers. The present invention is an unexpectedly unique and environmentally friendly composite structure containing mineral layers with bonding agents as a key component. The material is designed to form flexible and semi-rigid storage articles at equal or lower costs to prior art solutions while providing a mineral containing layer that is a very smooth, has comparatively high plasticity, and having a high quality printing surface not requiring Corona Treatment. The composite structure is used as a primary or secondary packaging container or insulating material. In addition to the mineral containing layer, the composite could contain various combinations of extruded resins, cast or blown films, and fibers. The mineral containing layer is substantially and continuously bonded to the other layers. The polymer, fiber, and mineral containing layers can be shaped, sized and manufactured such that the composite structure formed is subsequently machined to form a storage article. The composite structure has advantages including a high degree of pliability and flexibility, a minimum 37 dyne level on the surface of the mineral containing layer; a mineral containing layer that is highly 86 opaque, and has a bright, white printing surface that readily accepts coating and inks, therefore, rendering it highly attractive to consumers. Further, the composite structure has tensile strength, dead-fold, stiffness, and other characteristics that allow it to be readily machined into desired storage article forms and storage article closures, therefore, the material can be used for as a variety of food, consumer, industrial, anti-static, and commercial uses. Other mineral containing layer advantages include environmentally attractive features such photo-degradability, recyclability, compostability, and bio-degradability.

13 Claims, 5 Drawing Sheets

(56) References Cited

U.S. PATENT DOCUMENTS

| | | |
|---|---|---|
| 4,472,229 A | 9/1984 | Martin |
| 4,507,358 A | 3/1985 | Takaoka et al. |
| 4,692,212 A | 9/1987 | Swenson et al. |
| 4,851,458 A | 7/1989 | Hopperdietzel |
| 4,853,276 A | 8/1989 | Kurushima |
| 4,894,192 A | 1/1990 | Warych |
| 4,946,372 A | 8/1990 | Avni |
| 5,053,268 A | 10/1991 | Ehara et al. |
| 5,434,004 A | 7/1995 | Ajioka et al. |
| 5,494,735 A | 2/1996 | Nitta |
| 5,515,975 A | 5/1996 | Jarvis et al. |
| 5,803,260 A | 9/1998 | Tilton |
| 5,827,607 A | 10/1998 | Deaner et al. |
| 5,863,414 A | 1/1999 | Tilton |
| 5,962,123 A | 10/1999 | Mehta et al. |
| 6,016,913 A | 1/2000 | Tilton |
| 6,150,005 A | 11/2000 | Williams et al. |
| 6,274,248 B1 | 8/2001 | Goto et al. |
| 6,730,249 B2 | 5/2004 | Sears et al. |
| 6,787,205 B1 | 9/2004 | Aho et al. |
| 8,569,411 B2 * | 10/2013 | Tilton .................. 524/425 |
| 2002/0127358 A1 | 9/2002 | Berlin et al. |
| 2003/0203231 A1 | 10/2003 | Stopper et al. |
| 2003/0211348 A1 | 11/2003 | Mueller et al. |
| 2004/0052987 A1 | 3/2004 | Shetty et al. |
| 2006/0151350 A1 | 7/2006 | Tilton |
| 2006/0167169 A1 | 7/2006 | Arana |
| 2006/0198987 A1 | 9/2006 | Grob et al. |
| 2007/0025904 A1 | 2/2007 | Skuse et al. |
| 2007/0051653 A1 | 3/2007 | Tilton |
| 2009/0047511 A1 | 2/2009 | Tilton |

FOREIGN PATENT DOCUMENTS

| | | |
|---|---|---|
| FR | 2367594 | 5/1978 |
| GB | 1534128 | 11/1978 |
| JP | 62144931 | 6/1987 |
| JP | 02033399 | 2/1990 |
| JP | 01897829 | 8/1996 |
| JP | 10059468 | 3/1998 |
| JP | 2000015765 | 1/2000 |
| JP | 2001214396 | 8/2001 |
| JP | 2004507385 | 3/2002 |
| JP | 2006518316 | 9/2004 |
| WO | 0187596 | 11/2001 |
| WO | 02102593 | 12/2002 |
| WO | 03029001 | 4/2003 |
| WO | 2004074130 | 9/2004 |
| WO | 2005095515 | 10/2005 |
| WO | 2007078454 | 7/2007 |

* cited by examiner

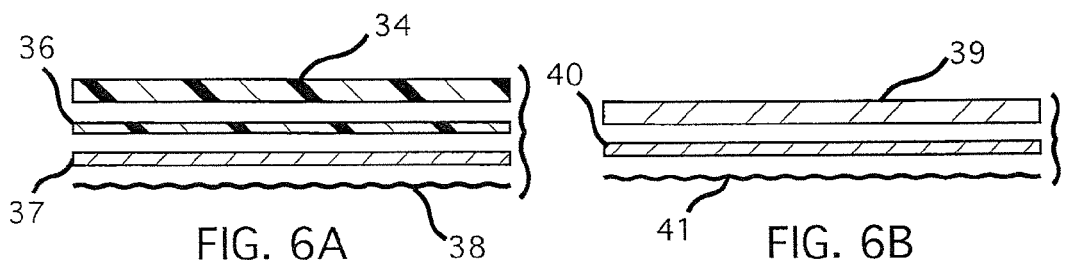
FIG. 6A PRIOR ART
FIG. 6B
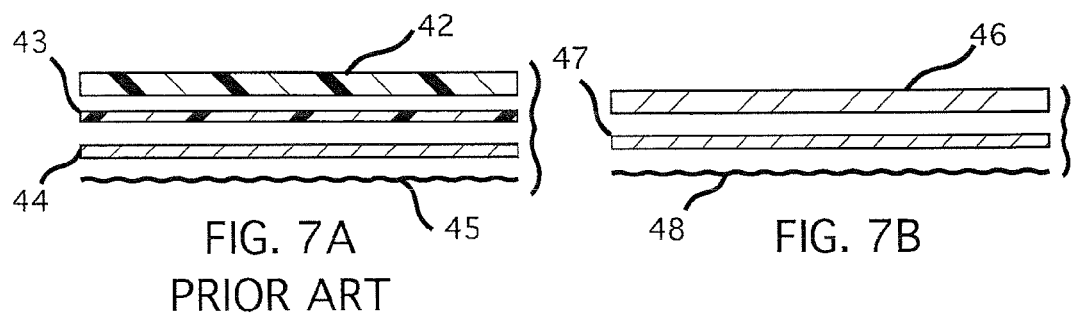
FIG. 7A PRIOR ART
FIG. 7B
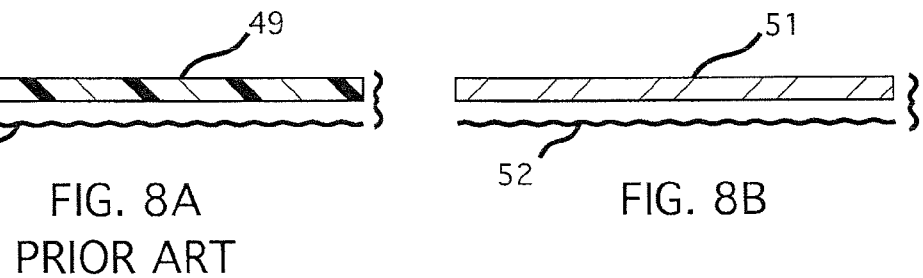
FIG. 8A PRIOR ART
FIG. 8B
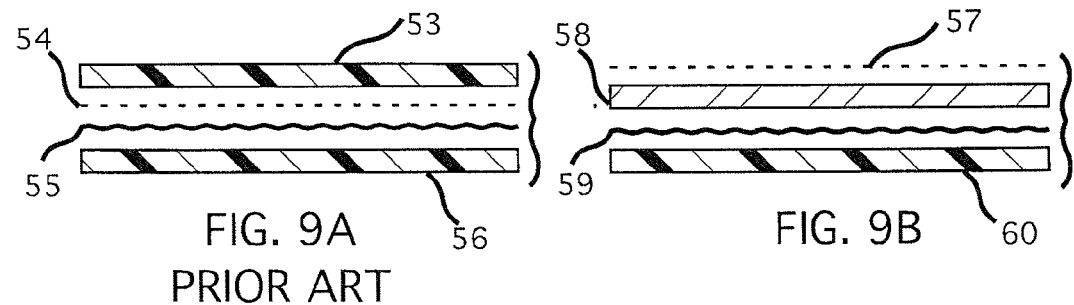
FIG. 9A PRIOR ART
FIG. 9B
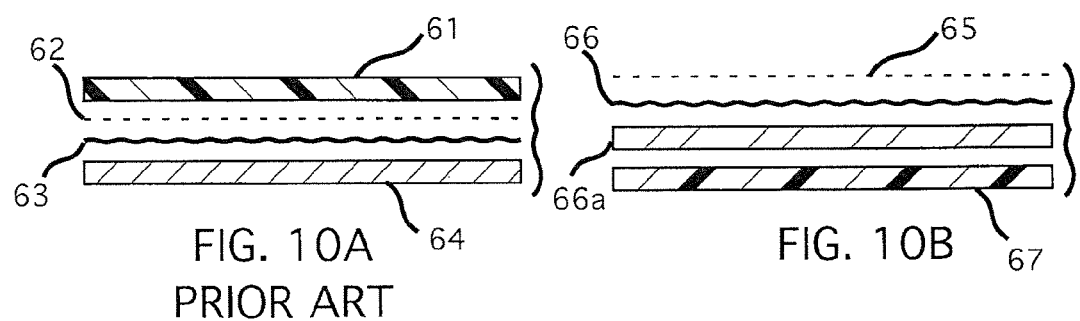
FIG. 10A PRIOR ART
FIG. 10B

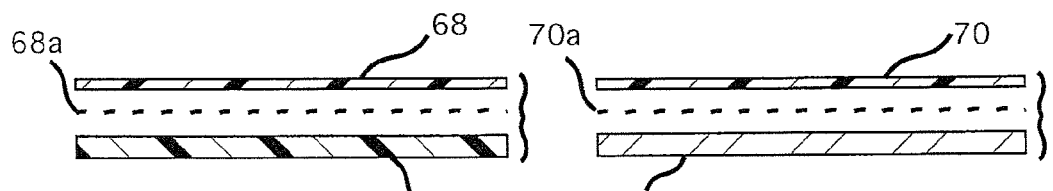
FIG. 11A PRIOR ART
FIG. 11B
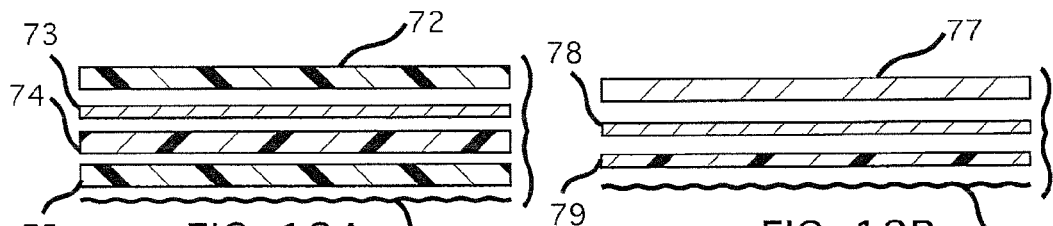
FIG. 12A PRIOR ART
FIG. 12B
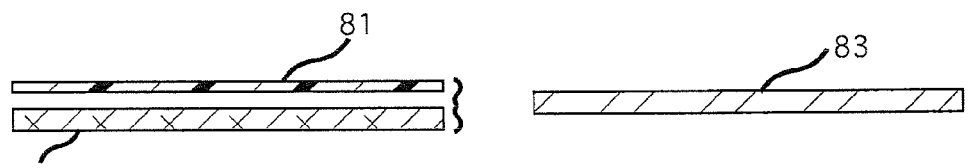
FIG. 13A PRIOR ART
FIG. 13B
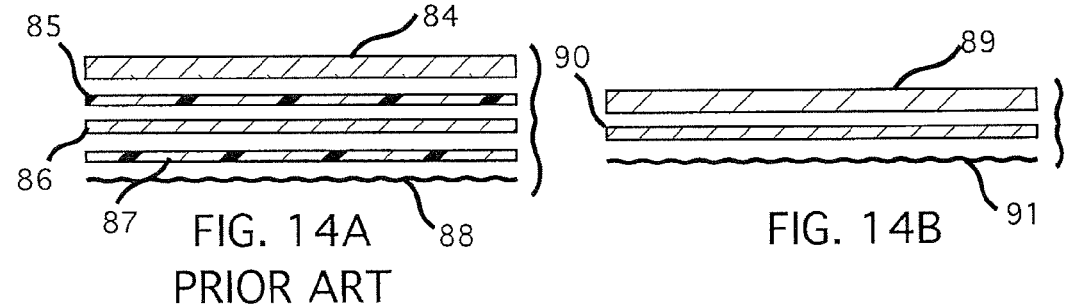
FIG. 14A PRIOR ART
FIG. 14B
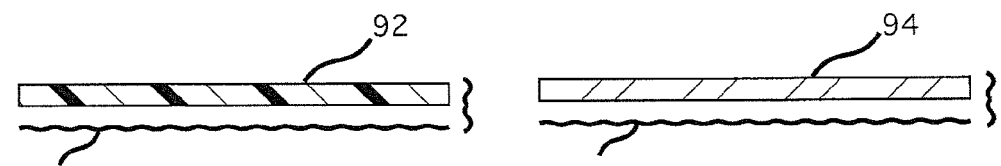
FIG. 15A PRIOR ART
FIG. 15B

FLEXIBLE PACKAGING COMPOSITES

CROSS-REFERENCE TO RELATED APPLICATION

This application is a continuation of U.S. patent application Ser. No. 12/193,577, filed on Aug. 18, 2008, and claims priority to U.S. Provisional Application No. 60/956,690, filed on Aug. 18, 2007, which is hereby incorporated by reference in its entirety.

BACKGROUND OF THE INVENTION

The present invention relates generally to flexible and semi-rigid film composites used for primary and secondary packaging within the retail, liquid, baked goods, mixes, beverages, confectionery, frozen, dry shelf, diary, meats, seafood, anti-static, dissipative, snack, shipping, sack, and bagged goods packaging industries. The composites having a substantially mineral-based or ground calcium carbonate-containing layer(s) such that it is highly attractive, has excellent printability, acts a barrier material, is highly efficient and significantly less expensive to manufacture, is pliable, scuff resistant and environmentally friendly.

Printed and unprinted primary and secondary flexible and semi-rigid packaging materials are commonly used for packaging retail, industrial, food, and commercial products into bags, sacks, pouches, wrappers, and the like. Key performance attributes of these materials include substantial barrier protection, product protection and containment, preservation, shipping, storage, and dispensing applications. Existing embodiments include preformed flexible containers, generally enclosed on all but one side, which form openings that may or may not to be sealed after filling, normally constructed of any single ply flexible material, multiple independent layers, flexible layers, and laminated constructions. Other related art includes inner liners or bags used for packaging consumer, food, or industrial products. Glassine, greaseproof paper, waxed paper, or plastic films are frequently used for this purpose in order to create the required contact surface or to provide a suitable barrier. With greasy products, liners prevent the staining of the bag material. Other applications include anti-static and dissipative film structures designed to protect packaging contents from accumulating the potential to deliver damaging electrical discharges.

Considerations taken into account in the development of such packages and materials include the cost of resins and the cost to extrude, blow, or cast the resins into film or sheets. Further costs include lamination into multi-layer constructions. Finally, the cost to convert, print and shape the films and their printability are crucial considerations. Many resins and converted flexible films are available to the market. Structural designs are often driven by barrier requirements between the enclosed product and the surrounding environment. In packaging, the term "barrier characteristics" is most commonly used to describe the ability of a material to stop or retard the passage of atmospheric gases, filled gases, water vapor, and volatile flavor and aroma ingredients. Barrier materials may serve to exclude or retain such elements without or within the package. Often sufficient barrier qualities can be achieved in design, however, the unprinted base film or base stock, which is the untreated film web-stock to which print, coatings, laminations, and other processes will be applied, does not contain adequate printability or is prohibitively expensive.

Printability is a key attribute for packages targeting the retail or point-of-sale industries. Printability is the ability of a material to yield printed matter of good quality. Printability is judged by the print quality and uniformity of ink transfer, rate of ink wetting and drying, ink receptivity, compressibility, smoothness, opacity, color, resistance to picking, and similar factors. Printability is different than run-ability, which refers to the efficiency with which a substrate may be printed and handled at the press. Further, structural and printability factors influence the ability of the materials to be printed using specific printing equipment. It is generally preferred if a material can be printed on a variety of equipment, maximizing quality of print and minimizing cost of manufacture. Printing techniques include flexographic, roto-gravure, heat-set, heat transfer, offset, offset lithography, non-contact laser, ink-jet, ultra-violet, hot stamp, screen, silk-screen.

Another key factor is process-ability, which is the ease with which a material can be converted into high quality useful products with standard techniques and equipment. For example, polyethylene, which is readily processed at low temperatures with no pre-treatments, would be considered more process-able than polyamide, which requires a much higher melting temperature and may need to be dried prior to processing.

Further, flexible materials or laminates that do not require further coatings for printability or printability additives during or post-extrusion are highly desirable for both quality and cost reduction. These features are quite attractive since polyethylene is a relatively inexpensive plastic currently in the order of approximately $1,500 USD per ton of unconverted resin.

Other key printability metrics include opacity, which is the ability of a material to stop the transmittance of light, quantified as the amount of light transmission. The opacity of a material is based upon the ratio of the diffused light reflectance of a material backed with a black body to the diffused reflectance of the same material backed with a white body. The higher the percent of opacity, the more opaque the material is said to be (ASTM D 589(b)).

Another key quality and printability standard is brightness. Brightness is a measure of light reflectance. Two objects may be described as "red," however, the one that reflects the greatest amount of received wave length will appear to be brighter. When using paper specifications to describe reflectance of white light (all wavelengths), brightness is expressed on a scale of 0 to 100. Papers such as newsprint are typically about 55 bright. Most quality printing papers are in the order of 80 bright; the higher the brightness, the more brilliant the printed graphics. The brightness scale is arbitrary rather than expressing a percentage, hence papers can have a brightness level above 100.

Frequently, polymer-based films and sheets have favorable structural and other characteristics, however, because of surface characteristics, do not possess sufficient printability. A treatment to alter the surface of the plastic and other materials to make them more receptive to adhesives or printing inks may be necessary. This is known as "Corona Treatment." Corona treatment includes a process of electrical discharges that create ozone, which in turn oxidizes the substrate surface and creates polar sites that contribute to strong bond formation. The treatment level is measured in dynes. A dyne in the (now deprecated) cgs system of units, is the force required to accelerate a mass of 1 gram by 1 centimeter per second squared. (1 dyne=$1\times10^5$ Newton). Thus, in packaging, it is used as a measure of surface energy or polarity of a surface. The dyne level is an indicator of the ability to wet out the surface with a liquid, forming a chemical bond with an adhesive, coating, or ink. The dyne level of a surface typically needs to be 37 or higher, depending on the nature of the adhesive substance. (ASTM D 2578). Corona treatment achieving a specific dyne level and required printability is required for a broad range of flexible, semi-rigid plastic, polymer films, and sheeting within the industry. This is an expensive and time consuming process. Materials not requiring Corona Treatment often do not provide the proper combination of structural or cosmetic benefits based on performance specifications.

Other important flexible and semi-flexible film and sheet characteristics include the ability of packaging material or packages to resist or attenuate an electrostatic field such that the field's effects do not reach or influence the package's contents. A form of protective packaging that is used for solid state electronic devices to prevent damage caused by electrostatic discharges, electrostatic fields, and triboelectric charge generation, is commonly referred to as anti-static packaging, but more correctly called dissipative packaging. Often, dissipative packaging is considered very expensive and not considered to have advanced printability characteristics. Further, a stationary electric charge developed on a material as a result of an accumulation or deficiency of electrons in an area. All insulating materials are capable of developing and holding a static charge. Depending on the material, the tendency may be greater or smaller and may favor the positive or negative. Arrangement of the materials in a table according to their tendency to develop a charge, and the nature of the charge, is known as turboelectric series. The further apart two materials are in the series, the greater the tendency to generate and hold a charge when rubbed against each other.

For medical and other specialized applications, sterilization is often a required step in the manufacturing process. Therefore, materials must be used that are compatible with the process of sterilization. This performance metric is often referred to as "sterilize-ability". This feature is defined as the ability to withstand contact with steam (moist heat) at 30 pounds pressure for 30 minutes, or contact with dry heat (circulating hot air) at 200 degrees Celsius for 15 minutes, or contact with ethylene oxide gas at specified temperature and pressure cycles. These processes would allow an article to be made free from living micro-organisms. Sterilizing agents may be steam, dry heat gamma rays, gas, or chemical sterilants.

The ability to withstand exposure to sun or other light can be an important material consideration. Light stability is the ability of a pigment, dye, or other colorant to retain its original color or physical properties when incorporated into plastics, inks, and other colored films or surfaces, when exposed to light. Additionally, the ability of a plastic or other material withstanding the deteriorating effect of exposure to sun or other light that results in physical material changes such as embrittlement, can be considered critical.

The weight, thickness, and density of materials are key considerations that materially affect cost, barrier characteristics, and yield of material substrates. These considerations greatly influence the film's structural performance and machine-ability. Normally, density is considered the mass of a given volume of material. In inch/pound units this is usually expressed in pounds per cubic foot. In ISO metric units, density can be given in kilograms per cubic meter ($kg/m^3$) or grams per cubic meter ($g/m^3$), although in packaging, grams per cubic centimeter ($g/cm^3$) is more common. Relative density is the ratio of the density of the observed object to that of water (density of water is 1 gram per cubic centimeter. Relative density, being a ratio, is unitless. Material weight is another key factor influencing cost, yield, and thickness specifications. In packaging, the material weight is referred to as "basis weight" and generally refers to the mass of a given area of a material. In paper and films, the basis weight is the weight in pounds of a ream of paper cut to its basic size. The basis weight for most packaging papers is reported as the pounds weight of 3000 feet squared of paper. For paperboard and linerboard used for corrugated containers, basis weight is expressed in lb. per 1000 feet squared. In metric, this is reported as the grammage or the grams per meter squared of a given material. Often, the heavier the basis weight, the more strength in performance and barrier characteristics, however, since most packaging materials are sold by weight (most often by ton) the higher the basis weight, the higher to cost per thousand square inches (MSI) and the lower the area yield per dollar spent. Therefore, materials that contain a high basis weight, yet comparatively inexpensive when sold by weight, are very cost attractive packaging materials.

Also, environmental considerations are considered key. Minimizing energy use, green house gas emissions, water use, discharge, and maximizing recyclability and bio-degradability are considered very important. Packaging materials that contain mineral-based materials are considered environmentally superior to plastics, most particularly to oil-based carbon materials, synthetic resins, and polymers. Additionally, the elimination or reduction of the weight of packaging is a primary consideration effecting eco-friendly objectives. Reduction is the first priority in a program to improve the environmental performance of a packaging system. Some definitions of source reduction also include the elimination of toxic materials used in packaging. Source reduction is one of the four R's of environmentally responsible packaging; the other being reuse, recycle, and recover.

Methods of enclosing and sealing flexible film structures are important manufacturing considerations. The efficiency, speed of production, and performance of the closure directly impact the quality and performance of the packaging. The sealing surface is the surface to which the seal will be made or the surface of the finish of the container on which the closure forms the seal. Often, when sealing materials together, a "sealer" material most be applied to one or more of the sealed surfaces. This coating is designed to prevent or retard the passage of one substance through another. For example, highly porous substrates might have sealer coats applied to reduce the absorption of adhesives, printing inks, or subsequent coatings.

Within the packaging industry, several types of sealing methods are employed. The "L-Bar" sealer is a heat sealing device that seals a length of flat, folded film on the edge opposite the fold and simultaneously seals a strip across the width at 90 degrees from the edge seals. The article to be packaged is inserted into between the two layers of folded film prior to sealing. When it is desired to cut the continuous length of sealed compartments into individual packages, a heated wire or knife is incorporated between two sealing bars that form the bottom of the L. These bars then make the top of the seal of the filled bag and the bottom seal of the next bag to be filled. Dielectric sealing is a sealing process widely used for vinyl films and other thermoplastics with sufficient dielectric loss, in which two layers of film are heated by dielectric heating, and pressed together between applicator and platen electrodes. The films serve as the dielectric of the so-formed condenser. The applicator may be a pinpoint electrode as in "electronic sewing machines", a wheel, a moving belt or a contoured blade. Frequencies employed range up to 200 MHz, but are usually 30 MHz or less to avoid interference problems.

Heat sealing is any method of creating as seal using heat. These include fusing plastic together by melting together at the interface or by activating a pre-applied heat-activated adhesive substance. Hot wire sealing is a sealing method using a hot wire to heat and fuse the plastic material. The sealing action simultaneously cuts through and separates the film. Impulse sealing is a heat sealing technique in which a surge of intense heat is momentarily applied to the area to be sealed, followed immediately by cooling. Solvent sealing is a method of bonding packaging materials, which depends of the use of small amounts of volatile organic liquid to soften the coating or surface of the material to the point where the materials will adhere. Ultrasonic sealing is the application of ultrasonic frequencies (20 to 40 kilohertz) to the materials being sealed together. The vibration at the interfaces generates enough localized heat to melt and fuse thermoplastic materials.

Several common methods of manufacturing flexible and semi-rigid sheets are found within the art. One such method is extrusion. This process forms thermoplastic film, or profile by forcing the polymer melt through a shaped die or orifice followed by immediate chilling. Profile extrusion produces continuous lengths of constant cross section.

Another method is cast extrusion. Using this method, film is made by extruding a thin curtain of thermoplastic melt onto a highly polished chilled drum. After the film solidifies, it is edge trimmed and wound into rolls for further processing.

Blown film is yet another, highly efficient method of manufacture. In this process, a thermoplastic film is produced by continuously inflating an extruded plastic tube by internal air pressure. The inflated film is cooled, collapsed, and subsequently wound into rolls. The tube is usually extruded vertically upward, and air is admitted through a passage in the center of the die as the molten tube emerges from the die. An air ring provides air flow around the outside of the bubble to increase initial cooling close to the die. Air is contained within the blown bubble by a pair of pinch rolls, which also serve to collapse and flatten the film. Film thickness is controlled by the die-lip opening, by varying bubble air pressure, and by the extrusion and take off rate. Thin films with considerable biaxial orientation can be produced by this method.

Films and sheets of different types, density, and thickness are often combined through lamination to accomplish the performance specification required for a package. Lamination is the process such that two or more sheets or films are adhesively bonded together in order to provide a group of enhanced properties not available in the individual films. During lamination, a "base film" is identified. The "base film" is an untreated film web stock to which print, coatings, laminations and other processes will be applied. Some lamination layers are oriented at right angles from other layers with respect to grain or strongest direction in tension, this technique is known as "cross lamination". "Wet Lamination" joins two or more webs with aqueous or solvent based adhesives, which are driven off after joining. "Dry bond" laminating applies to adhesive to only one of the webs. After drying or curing, webs are joined with heat and or pressure. Other common laminating techniques are extrusion and hot melt in which the adhesive or bonding material is introduced in hot liquid form and the bond is affected when it solidifies. "Wax Lamination" is a laminate in which wax has been used to join two substrates. Wax is economical, however, at other than ambient temperatures, it can have poor performance properties.

Depending upon the material(s) used, additional manufacturing techniques may be required to enhance film performance. Often, this is the case or moisture or gas barrier requirements. One such technique is vacuum metalizing. It occurs upon the deposition, in a vacuum chamber, of vaporized aluminum molecules over the surface of a film or paper substrate. Metalizing provides a lustrous metallic appearance and when applied to plastic film, improves gas and light barrier properties. Metalized films are also used to dissipate static electrical charges, reflect radiant heat and for microwavable packaging. Adding Nitrile resin is another polymer material option containing high concentrations of nitrile having outstanding barrier properties. Generally the constituents are greater than 60% acrylonitrile along with comonomers such as acrylates, methacrylates, butadiene, and styrene.

Various films are used in multi-layered laminated structures to achieve the desired results. Polyethylene film is by far the largest volume transparent flexible packaging material because of a combination of transparency (low density types), toughness, heat seal-ability, low water vapor transmission rate, low temperature performance and low cost. Polyethylene films are highly permeable to oxygen and other non polar gases and have high viscoelastic flow properties. Available with a wide range of specific properties to meet individual needs. PE can be clear or translucent depending on density. It is a tough, waxy solid, that is unaffected by water and is inert to a large range of chemicals. Polyethylene is marketed in three general categories: low, medium, and high density. Films can also be made of polylactic acid (PLA), which is a biodegradable polymer made from renewable resources (primarily corn derived dextrose). Only recently made available in commercial quantities, PLA has potential applications in wraps, films, and thermoformed parts. Polyethylene terephthalate (PET) film is a thermoplastic film of high strength, stiffness, transparency, abrasion resistance, toughness, high temperature resistance, and moderate permeability. Generally used in sections of 0.0005 inch or less and laminated to less expensive materials. PET's high temperature tolerance makes it a preferred material for ovenable applications. PET is often referred to as polyester. While this term is not incorrect, polyester is a family name for a large group of polymeric materials. PET refers specifically to the polyester used in packaging applications. Polyvinyl alcohol (PVAL) is a water-soluble thermoplastic prepared by partial or completed hydrolysis of polyvinyl acetate with methanol or water. Its principal uses are in packaging films, adhesive, coatings, and emulsifying agents. Its packaging films are impervious to oils, fats, and waxed, have very low oxygen transmission rates, and most often used with other thermoplastics as a barrier coating or layer. PVAL coatings and layers must be protected from water.

Polypropylene (PP) film is a transparent, tough, thermoplastic film usually made by cast extrusion. Un-oriented film is soft and becomes brittle at low temperature, however this property as well as strength, stiffness, and clarity can be improved by orientation e.g. bi-axially oriented polypropylene (BOPP). Polystyrene film is a transparent, stiff film of high permeability and moderate temperature resistance, typically made by extrusion or casting, and can be oriented to improve strength. PVC film is a transparent to translucent film (depending upon plasticizers and stabilizers) made by extrusion or casting. Excellent grease and solvent resistance, low to moderate gas permeability, moderate temperature range. Films can also be made of polyamide (PA). Commonly known as nylon. A polymer made by the reaction of a dibasic acid and an amine. There are many dibasic acids and many amines, giving the possibility of many polyamides, few of which are used in packaging. PA is used almost entirely as a film or sheet material in packaging applications. The clear film offers a good oxygen barrier, is particularly tough and abrasion resistant, and can be drawn easily into thermo-formed trays. However, it is a poor moisture barrier, does not heat seal, and has cost disadvantages. Films can also be made of polychlorotrifluoroethylene (PCTFE or CTFE), which is a plastic material characterized by exceptional moisture and good oxygen barrier characteristics as well as good clarity and easy thermoformability. Its costs restrict it mostly to the pharmaceutical industry. Films can also be made of polyester, a polymer made by the reaction of a dibasic acids and many glycols, giving the possibility of many polyesters, some of which are thermoses and some of which are thermoplastics. Packaging uses a thermoplastic polyester made by the reaction of terephthalic acid and ethylene glycol. The term polyester commonly refers to poly(ethylene terephthalate), abbreviated most commonly as PET. It is also known as PETE on plastic identification codes. Metalized polyester film is a PET film on which a minute amount of aluminum has been vacuum deposited to improve barrier properties, enhance appearance or to produce a heating structure for microwave packaging applications. Films formed of kraft and other papers are fiber roll stock and sheet paper materials are used in flexible film applications for low cost layers providing structure, stiffness, dead-fold, tensile strength and some degree of printability.

A problem that exists with prior packaging products and films is that these products may not incorporate environmentally friendly materials and designs, particularly with laminated structures and most particularly at low cost levels that offer affordability. Environmentally friendly materials can have desirable attributes such as biodegradability, compostability, a high recycled content, recycle-ability, and may also use less energy, pollute less, and generate fewer greenhouse gases in their manufacture than previous materials. Such environmentally friendly materials are increasingly in demand from consumers and retailers, and can be beneficial for manufacturers by reducing adverse environmental impact of the material.

Another significant problem that exists with prior flexible film packaging, laminations, and composites is the high concentration of expensive plastic and polymers required to achieve the performance specifications needed. Another problem is the need for laminating very expensive combinations of plastics, foils, coatings, metalized films, etc to achieve structural, barrier, sealing and printability aspects; this is the most significant problem within the art as polymer based materials can range from approximately $1,500 to $4,000 per ton of pre-converted resins, depending upon the material(s) used and the application. Additional problems include obtaining bright, white, opaque printing surfaces on barrier films without multi-layer laminations, corona treating for ink adhesion, or coating that treat film surfaces for quality lithography, flexographic, and offset printing. Other desired characteristics include sterilize-ability, anti-static/dissipative characteristics, and machine-ability during converting and printing.

SUMMARY OF THE INVENTION

The present invention specifically addresses and alleviates the above-identified deficiencies in the art. In this regard, the present invention is directed to an environmentally friendly flexible film composite suitable for fabricating packaging for storage of articles at least partially therefrom (e.g., a retail and/or shipping package). The composite structure includes a unique high percentage by weight mineral-containing layer, such as ground calcium natural sources, with the concentrated mineral-containing layer covering adhered to other mineral layers or other flexible film layers through lamination and cross lamination wherein the mineral-containing layer is substantially and continuously bonded to the other layers along the surface of the film or sheet. The film and mineral-containing layer(s) can be shaped, sized and manufactured such that the composite structure formed is capable of being shaped to form at least a portion of the storage article. The composite structure also has enhanced characteristics such as a bright white, opaque and attractive printing surface that, along with the pliability, render it attractive to consumers. The mineral container layer of the composite structure provides an external printable surface of the composite, and can be printed on using a variety of printing techniques without pre-treatments including roto-gravure, heat set, heat transfer, screen, silk screen, laser offset, flexographic, and UV, for example. The composite structure further has mass, stiffness, and tensile strength and other characteristics that allow it to be readily machined into desired storage article forms, such as storage boxes pouches, sleeves, bags, gusseted bags, side gusseted bags, sacks, gusseted stand up, re-closable stand-up, labels, shelf papers, and many other flexible film constructions within the art, all of which have high durability as well as good moisture resistance and biodegradability. Further, the flexible film composite mineral-containing layer, in combination with other layers, can be sealed to closure using and standard sealing method consistent with sealing thermoplastic containing materials. The mineral-containing layer used in composites provides a very dense, high basis weight substrate. This substrate offers the benefits of density and weight, however, because the low cost per ton of earth based minerals, it does not have the high costs per ton normally associated with plastic and polymer films, allowing favorable dollar yields per MSI. Finally, the mineral substrate alone or in combination with other materials in a composite can perform as a low cost sterilize-able as well as an anti-static, substantially non electrical conductive barrier film.

The present invention is best understood by reference to the following detailed description of preferred embodiments when read in conjunction with the accompanying drawings.

BRIEF DESCRIPTION OF THE DRAWINGS

FIG. 3A is a schematic side view of a prior art flexible material structure designed for packaging nuts, dried, foods, cooking bits, and the like.

FIG. 6A is a schematic side view of a prior art flexible material structure designed for coffee, either vacuum packed or with venting valve.

FIG. 6B is a schematic side view of a ground calcium carbonate-containing layer in a flexible composite structure designed for coffee, either vacuum packed or with venting valve, according to aspects of the present invention.

FIG. 7A is a schematic side view of a prior art flexible material structure designed for use in liquid, stand up pouches (routinely 4.4 to 5.5 mil thickness).

FIG. 7B is a schematic side view of a ground calcium carbonate-containing layer in a flexible composite structure designed for liquid, stand up pouches (routinely 4.4 to 5.5 mil thickness), according to aspects of the present invention FIG. 8A is a schematic side view of a prior art flexible material structure designed for use in cold cereal products with a bag-in-box style.

FIG. 8B is a schematic side view of a ground calcium carbonate-containing layer in a flexible composite structure designed for use in cold cereal products with bag-in-box style, according to aspects of the present invention.

FIG. 9A is a schematic side view of a prior art flexible material structure designed for use in a cold cereal printed bag that includes a re-closure.

FIG. 9B is a schematic side view of a ground calcium carbonate-containing layer in a flexible composite structure designed for use as a cold cereal printed bag that includes a re-closure, according to aspects of the present invention.

FIG. 10A is a schematic side view of a prior art flexible material structure designed for use in as a printed packaging material for retail food breakfast bars.

FIG. 10B is a schematic side view of a ground calcium carbonate-containing layer in a flexible composite structure designed for use as a printed packaging material for retail food breakfast bars, according to aspects of the present invention.

FIG. 11A is a schematic side view of a prior art flexible material structure designed for use in a composite when additional moisture barrier is needed.

FIG. 11B is a schematic side view of a ground calcium carbonate-containing layer in a flexible composite structure designed for use as a composite when additional moisture barrier is required, according to aspects of the present invention.

FIG. 12A is a schematic side view of a prior art flexible material structure designed for use in a stand up structure containing bite-sized candy.

FIG. 12B is a schematic side view of a ground calcium carbonate-containing layer in a flexible composite structure designed for use as a stand up structure containing bite-sized candy, according to aspects of the present invention.

FIG. 13A is a schematic side view of a prior art flexible material structure designed for use in a structure for many M & M candy products.

FIG. 13B is a schematic side view of a ground calcium carbonate-containing layer in a flexible composite structure designed for use as a composite material designed for use in a structure for many M & M candy products, according to aspects of the present invention.

FIG. 14A is a schematic side view of a prior art flexible material structure designed for use in a structure for the Chips Ahoy cookie brand by Nabisco and includes a tin-tie from Bedford Industries for re-closure.

FIG. 14B is a schematic side view of a ground calcium carbonate-containing layer in a flexible composite structure designed for use as a composite material designed for use in a structure for the Chips Ahoy cookie brand by Nabisco and includes a tin-tie from Bedford Industries for re-closure, according to aspects of the present invention.

FIG. 15A is a schematic side view of a prior art flexible material structure designed for use in a structure for some Snack Wells products that are packaged in unprinted laminate polypropylene with and extrusion of sealant on the inside.

FIG. 15B is a schematic side view of a ground calcium carbonate-containing layer in a flexible composite structure designed for use as a composite material designed for use in a structure for some Snack Wells products that are packaged in unprinted laminate polypropylene with and extrusion of sealant on the inside, according to aspects of the present invention.

DETAILED DESCRIPTION OF THE PREFERRED EMBODIMENTS

Figure 1A:
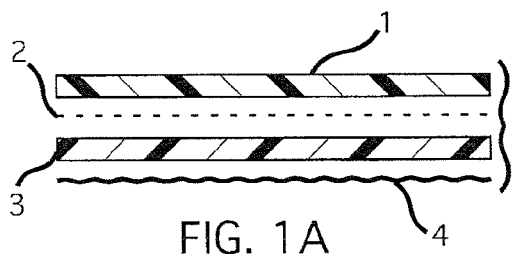
FIG. 1A is a schematic side view of a prior art laminated flexible film material designed for use in a frozen vegetable re-closable stand up package.

The detailed description set forth below is intended as a description of the presently preferred embodiment of the invention, and is not intended to represent the only form in which the present invention may be constructed or utilized. The description sets forth the functions and sequences of steps for constructing and operating the invention. It is to be understood, however, that the same or equivalent functions and sequences may be accomplished by different embodiments and that they are also intended to be encompassed within the scope of the invention.

An example of an environmentally friendly mineral material currently unknown in laminated flexible film applications is ground calcium carbonate (GCC), and other minerals which are materials that can be combined with bonding agents and extruded to form material layers of roll stock, film, and sheets. Because, by weight, the bonding agents comprise a only a smaller percentage of the finished material (approximately 15%-30%), it is very cost effective, yet maintains properties typically associated with more expensive plastics, polymers, as well as laminated and cross laminated flexible films. Further, it is produced using high speed blown film processes, further lowering the cost of manufacturing and increasing the accuracy maintaining manufacturing specifications and quality. Because GCC in particular is naturally white, bright, and opaque, it has outstanding printability qualities and does not require Corona Treating or other surface coatings, further reducing costs. Because the material contains thermoplastic content as a bonding agent (albeit reduced content) it is compatible with the various previously stated sealing methods, allowing for efficient filling and sealing during the packaging process. The GCC or other mineral content material such as earth based materials e.g. talc, diatomaceous earth, mineral-containing layer, mica, silica, glass, clays, zeolytes, slate, which are materials that can be combined with bonding agents to form flat rolls and sheets producing very dense and heavy basis weight films that provide an external printable surface for the flexible film composite of the invention at a lower cost than polymers, far offsetting lower yield with even lower cost per ton, making it a very unique, cost effective and attractive flexible film packaging material. Also, the mineral content offers, without treatment or coatings some of the same gas and moisture barrier qualities at a comparatively low cost.

A key feature of this primarily mineral based material is plasticity characteristics, invaluable in laminate and composite structures that enables it to be continuously deformed without rupture when acted on by a force sufficient to cause flow and allows it to retain its shape after the applied force has been removed. Plasticity, like consistency, is a qualitative term, representing a composite of physical properties. Plasticity may not be defined quantitatively because it is a complex property made up of yield value and mobility, or their equivalent.

The mineral based materials can be fabricated from natural sources, such as limestone among others, and can be biodegradable, photo-degradable, and compostable, use less energy, no water, and fewer chemicals to manufacture than fibers, and thus when combined with and significantly displace polymers and plastics in a wide variety of flexible and semi-rigid film packaging applications. The bonding agents in the construction include but are not limited to high-density polyethylene (HDPE) which is a hydrocarbon polymer that has linear chains allowing for dense packing resulting in a density between 0.94 and 0.96 or more. HDPE is economical, can be processed easily by most methods, has good moisture barrier properties, and good chemical resistance. It has a comparatively low melting point, is translucent in most forms, is relatively soft for excellent machine-ability, it also has high elongation. Polymers such as HDPE can be made to be photodegradable, typically by introducing one or more additives, typically during extrusion, such as ketone groups sensitive to UV light which can cause scissioning of the polymer, or other photosensitizing additives that can initiate photooxidation of the polymer, also resulting in scissioning of the polymer. Another bonding agent is high molecular weight high density polyethylene (HMWHDPE). This polyethylene family material is generally defined as linear copolymer or homo-polymer with average molecular weights in the range of 200,000 to 500,000. Melt flow index according to ASTM D 1238, Condition F is another way of defining them, since the melt index is inversely proportional to molecular weight. Their high load melt index is in the range of 15 grams per 10 minutes. Most HMW polymer grades are copolymers in the density range of 0.944 to 0.954 grams per cubic centimeter.

This mineral based material can create excellent films (below 0.003 inches) and sheets (above 0.003 inches). Environmentally friendly ground calcium carbonate materials include products similar to ones with the tradename ViaStone™ that is manufactured by Taiwan Lung Meng Corporation, XTERRANE, Taipei, Taiwan, and other various manufacturers that is incorporated into a synthetic commercial printing paper. The ground calcium carbonate or other mineral content materials can be fabricated from natural sources, such as limestone, and can be biodegradable and compostable, use less energy, no water, and fewer chemicals, and thus represents an advantage over other non-biodegradable and less environmentally friendly materials.

Figure 1B:
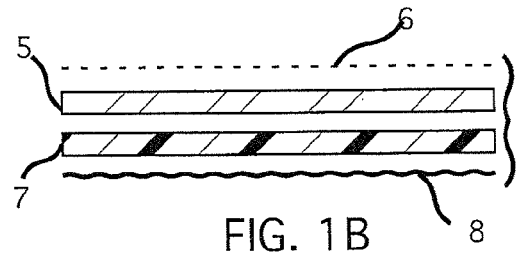
FIG. 1B is a schematic side view of a mineral-containing laminated flexible film material designed for use in a frozen vegetable re-closable stand up package, according to aspects of the present invention.

It has been discovered that great costs savings, environmental features, and improved graphics can be achieved by utilizing a layer of blown film GCC or other mineral based films containing by substantial weight up to 85% minerals combined with bonding agents such as HDPE or other materials. One such advantage can be obtained over prior art FIG. 1A. FIG. 1A is a flexible film structure used as an Ore-Ida vegetable package. This film structure contains layer 1 (PET), layer 2 (Ink), layer 3 (Co-extruded Nylon), layer 4 (Sealant). FIG. 1B is an improvement, utilizing a unique mineral-containing layer in the composite forming a new structure comprised of layer 6 (Ink), layer 5 (Mineral film with bonding agent), layer 7 (Co-Extruded Nylon), and layer 8 (Sealant). By replacing PET layer 1 with cost effective mineral film layer 5, thus making it possible to relocate ink layer 2 as shown in FIG. 1B, resulting in improved printability and a more pleasing and attractive presentation including print surface opacity and brightness, higher ink wetting, pick resistance, ink transfer compared to the previously used PET layer, as well as a tensile strength and other processing-related characteristics that are suitable for the production of the package. Also, this was accomplished without the costly added step of Corona Treating. Cost efficiencies include a mineral-containing layer costing less than 50% per ton than the prior art PET containing layers.

Figure 2A:
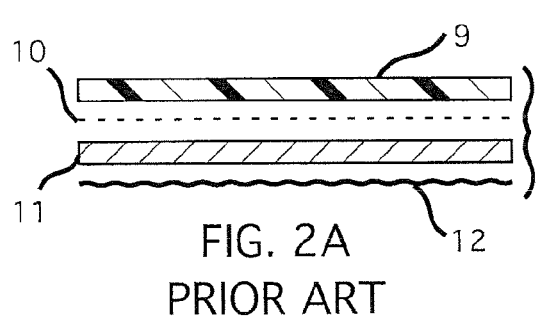
FIG. 2A is a schematic side view of a prior art laminated flexible film package with high quality graphics designed to form a vertically filled package with a side gusset for standing upright when displayed.
Figure 2B:
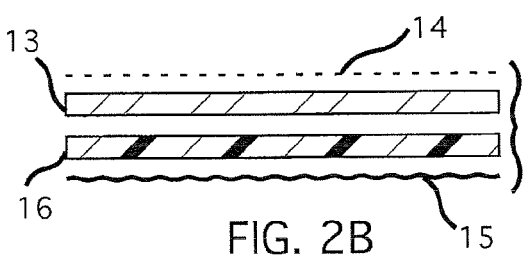
FIG. 2B is a schematic side view of high mineral content containing layer laminated flexible film package with high quality graphics designed to form a vertically filled package with a side gusset for standing upright when displayed, according to aspects of the present invention.

FIG. 2B is an embodiment that offers significant advantages over prior art FIG. 2A. FIG. 2A is a laminated structure with a top layer 9 comprised of PET, the second layer 10 comprised of ink, the third layer 11 Metalized OPP film and the fourth layer 12 Heat Seal Coating. The purpose of this material is for the Stouffers Oven Sensations package. FIG. 2B is comprised of surface applied ink 14, adhered to mineral-containing layer 13, comprised of GCC with bonding agents which is then adhered to non-metalized OPP layer 16, and finally sealant layer 15. Because of excellent surface print registration, smoothness, gloss, brightness and opacity inherent in the mineral container layer, print quality of surface applied ink 14 is excellent (see table 1, below) such that the OPP layer 16 does not require expensive print quality treatments. Also, the bonding agent in mineral-containing layer 13 has sufficient moisture resistance for proper packaging performance.

TABLE 1

Surface Printability and Quality ratings

| | Caliper (Mils) | | | | | | | |
|---|---|---|---|---|---|---|---|---|
| | 3.2 | 4.0 | 4.8 | 5.6 | 8.0 | 12 | 16 | |
| Whiteness % | 90+ | 90+ | 90+ | 90+ | 90+ | 90+ | 90+ | TAPPI T-525 |
| Gloss Value % | 6 | 6 | 6 | 6 | 6 | 6 | 6 | TAPPI T-480 |
| Opacity % | 83 | 86 | 88 | 88 | 90 | 90 | 90 | TAPPI T-425 |
| RRoughness -UM | 3 | 3 | 3 | 3 | 3 | 3 | 3 | TAPPI T-555 |
| Surface Resistance-S | $10^{11}$ | $10^{11}$ | $10^{11}$ | $10^{11}$ | $10^{11}$ | $10^{11}$ | $10^{11}$ | TAPPI T-527 |

*In addition to increased ink coverage, the quality of the printing surface is excellent and has a excellent Sheffield smoothness.

Significant cost reductions result because the metalized OPP layer 11 used on prior art FIG. 2A is no longer required, also, FIG. 2B layer 14 no longer requires metalized OPP. Further, the mineral layer 13 is 50% less expensive than prior art PET layer 9, which is not a required component of the structure of FIG. 2B.

Figure 3A:
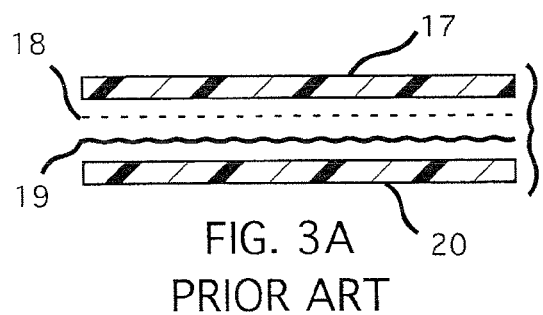
Figure 3B:
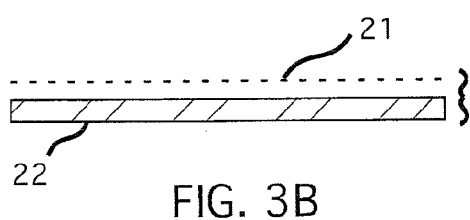
FIG. 3B is a schematic side view of a ground calcium carbonate-containing layer in a flexible composite structure designed for packaging nuts, dried foods, cooking bits, and the like, according to aspects of the present invention.

Prior art FIG. 3A shows a 3-layer laminated flexible film composite used as a packaging material containing nuts, dried fruits, cooking bits, and the like. Prior art FIG. 3B is designed to print with high quality and utilize the structural rigidity, tensile strength and stiffness provided by the OPP layers 17 and 20, sandwiching ink layer 18 and sealant layer 19. FIG. 3B illustrates an improvement made possible by using only a mineral-containing layer 22 and ink surface 21. The flexible packaging composite of FIG. 3B dramatically reduces material costs by using a single ground calcium carbonate (GCC) layer 22 instead of two OPP layers 17 and 20. GCC with HDPE bonding agents layer 22 is less than 50% cost per ton compared to the combined OPP layers 17 and 20. Further, the surface print quality and printability aspects of layer 22 are improved over layers 17 and 20. Additionally, the mineral-based layer and composite of FIG. 3B is compostable, bio-degradable, photo-degradable, recyclable, sustainable and during manufacturing emits no water borne or airborne chemicals into the environment and uses less energy and delivers no greenhouse gas ($CO_2$) emissions. See Table 2, below.

TABLE 2

Energy Consumption
Please refer to the table below for the energy consumption ratio:

| | RMP | Polymer Films |
|---|---|---|
| Ratio | 1 | 2 |
| Energy Consumption | $1764 \times 10^3$ Kcal/TP | $3549 \times 10^3$ Kcal/TP |

Figure 4A:
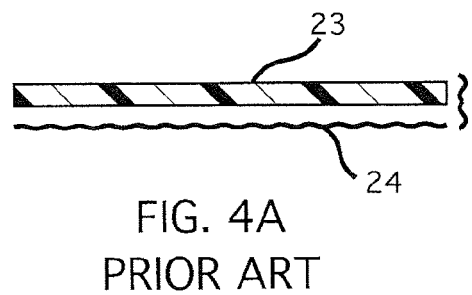
FIG. 4A is a schematic side view of a prior art flexible material structure designed for bag-in-box applications for dry mixes.
Figure 4B:
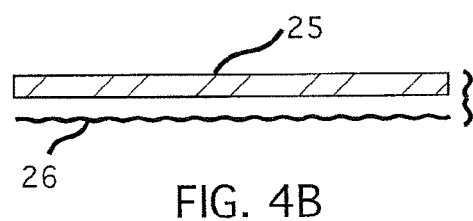
FIG. 4B is a schematic side view of a ground calcium carbonate-containing layer in a flexible composite structure designed for bag-in-box applications for dry mixes, according to aspects of the present invention.

The energy consumption calculations are shown below:
Note: Electricity to Energy Conversion=2450 Kcal/KWH
  Steam to Energy Conversion=655 Kcal/kg
Mineral layer+Bonding Agent:
  During production, electricity consumption is 720 KWH/TP. RMP does not have any steaming process.
  Electricity energy consumption=$720 \times 2450 = 1764 \times 10^3$ Kcal/TP Prior art FIG. 4A is a typical flexible film composite in varying thicknesses used for bag-in-box applications for dry mixes. Layer 23 is coextruded HDPE and layer 24 is a sealant. Because coextruded HDPE is much more expensive by weight than a mineral layer 25 comprised of 70% minerals (by weight) and 30% or less by weight HDPE, because of the significant reduction of HDPE, the structure of FIG. 4B is far more cost effective to manufacture. The improvement of the structure of FIG. 4B also maintains sufficient barrier characteristics required of the package. Additionally, the mineral based layer and the entire composite structure illustrated in FIG. 4B is compostable, bio-degradable, photo-degradable, recyclable, sustainable and during manufacturing emits no water borne or airborne chemicals into the environment as well as using less energy and expelling no greenhouse gas ($CO_2$) emissions.

Figure 5A:
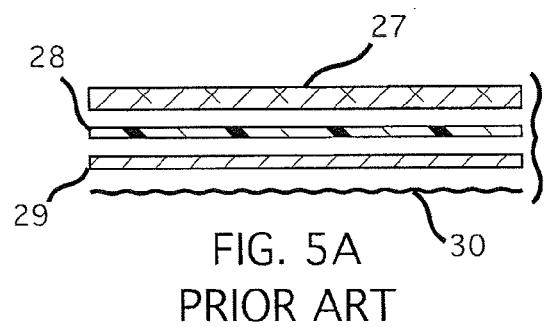
FIG. 5A is a schematic side view of a prior art flexible material structure designed for dry beverage mix products.
Figure 5B:
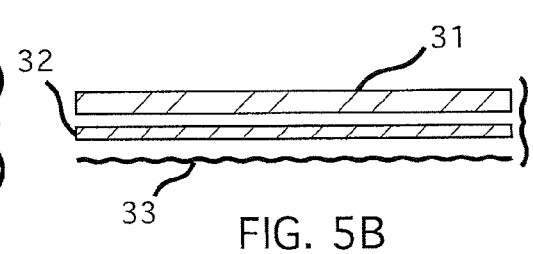
FIG. 5B is a schematic side view of a ground calcium carbonate-containing layer in a flexible composite structure designed for dry beverage mix products, according to aspects of the present invention.

FIG. 5A shows a prior art flexible packaging composite used for dry beverage mix products. It is comprised of paper layer 27, polyethylene layer 28, foil layer 29, and sealant layer 30. In this application the paper layer 27 provides some structural stiffness, the polyethylene layer some pliability, and the foil layer structure and moisture barrier properties. FIG. 5B shows an improved structure using a mineral material containing layer 31. It also contains a foil layer 32 and sealant layer 33. The flexible film structure of FIG. 5B offers cost advantages resulting from reducing a previously 4 layer to a 3 layer composite. Also, pliability and printability are provided by the mineral-containing layer 31. Because the HDPE bonding element in mineral layer 31 has inherent moisture barrier and structural characteristics, the foil layer 32 can be reduced from in caliper further reducing costs. Additionally, the mineral based layer 31 is compostable, biodegradable, photo-degradable, recyclable, sustainable and during manufacturing emits no water borne or airborne chemicals into the environment as well as using less energy and expelling no greenhouse gas ($CO_2$) emissions.

Prior art FIG. 6A shows a flexible packaging structure used for coffee, either vacuum packed or valve vented. Layer 34 is polyester, layer 36 is polyethylene, layer 37 is foil, and layer 38 is sealant. FIG. 6B shows an improvement over prior art structure of FIG. 6A. It contains 1 fewer layers comprising of layer 39 ground calcium carbonate with bonding agent, layer 40 is foil, layer 41 is sealant. Layers 34 and 36 provide substantial pliability and formability as well as printability. Layer 37 offers complete moisture barrier characteristics, structure, and tensile strength. However, pliability, printability and formability can be provided by the single layer, 39, at far less cost of material per ton. Further, the print quality of layer 39, with gloss coating, exceeds that of layer 34. The structure of FIG. 6B, uses fewer layers and offers more efficient production efficiencies than a 4 layer FIG. 6A.

The prior art flexible packaging structure of FIG. 7A is used for liquid-filled stand up pouches, which are normally manufactured in thicknesses of 4.5 to 5.5 mil. It contains layer 42 polyester, layer 43 nylon, layer 44 foil, and layer 45 sealant. FIG. 7B is a structure comprised of layer 46, a ground calcium carbonate layer with bonding agent, layer 47 foil, and layer 48 sealant. Polyester layer 42 is a strongly scratch resistant, however, it is very expensive and often requires Corona Treatment for acceptable printability. Layer 43 nylon also offers high tensile strength, however, it is also very expensive. The structure of FIG. 7B is an improvement such that it is far less expensive but offers excellent printability without costly Corona Treatments. Further, as a single material, layer 46 performs the functions of both nylon and polyester in this application.

The prior art flexible packaging structure of FIG. 8A is a coextruded 100% HDPE film material layer 49 used for cold cereal products packaged in a bag-in-the box style. This material ranges in thicknesses from 1.75 mil to nearly 2.75 mil, with pre-extruded resin costs exceeding $2,000 per ton. A remarkable improvement is shown in FIG. 8B showing ground calcium carbonate with HDPE bonding agent, layer 51 and sealant layer 52. Layer 52 maintains adequate barrier characteristics compared to layer 49 at approximately 50% less cost per ton. Also, if desired, layer 51 can provide previously unavailable high quality printability. Additionally, the mineral based layer 51 is compostable, bio-degradable, photo-degradable, recyclable, sustainable, and during manufacturing emits no water borne or airborne chemicals into the environment as well as using less energy and expelling no greenhouse gas ($CO^2$) emissions.

The prior art flexible film packaging structure of FIG. 9A is a representative material used for the cold cereal printed bags with a re-closure. Layer 53 is polypropylene (PP), layer 54 is ink, layer 55 is adhesive, and layer 56 is PP. FIG. 9B shows an improved structure, containing layer 57 ink, layer 58 ground calcium carbonate with HDPE bonding agent, layer 59 adhesive, and layer 60 PP. Since PP is significantly more expensive than layer 58 an 85% mineral film, significant cost savings will result by replacing PP layer 53 with mineral layer 58. Also, no Corona Treatment is required to achieve high quality graphics and printability.

The prior art flexible film packaging composite shown in FIG. 10A is a representative film used packaging breakfast bars. It contains layers PP layer 61, ink layer 62, adhesive layer 63, and metalized film layer 64. An improved composite structure is shown in FIG. 10B. It contains ink layer 65, adhesive layer 66, ground calcium carbonate mineral layer with bonding agent 66a, and non-metalized film layer 67. Since no layer 61 PP film is required, the improved structure of FIG. 10B offers the advantage of far lower costs. Also, because the PET film layer 67 does not require metallization, additional cost reductions are achieved.

The prior art film structure shown in FIG. 11A is flexible film structure that is often used in the manufacture of home use shelf paper. Layer 68 a peel and stick label backing, layer 68a is a commonly found label adhesive, layer 69 is comprised of PVC or similar plastic or type of polymer material. An improved structure for this application is shown in FIG. 11B. The improved structure contains layer 70 which is a peel and stick label backing, layer 70a which is a commonly found label adhesive, and layer 71 which is ground calcium carbonate with bonding agent. This is a remarkable improvement because the mineral layer 71 cost per ton is far less than PVC layer 69. Also, the printability of layer 71 far exceeds PVC layer 69, greatly improving the product's appearance at the point of sale. Further, layer 71 does not require Corona Treatment for high quality and efficient printing.

Prior art FIG. 12B shows a structure for a stand up bag containing bite-sized candy. It contains layer 72 PET, layer 73 which is a 50 gauge metalized OPP, layer 74 of polyethylene, layer 75 of polyethylene, and layer 76 which is a sealant. FIG. 12B shows an improved flexible film composite structure. It includes layer GCC layer with bonding agent 77, metalized OPP layer 78, polyethylene layer 79, and sealant layer 80. Significant cost reductions occur because PET layer 72 is no longer needed and replaced by GCC layer 77. Also, because of the tensile strength and pliability of GCC layer 77, metalized layer 73 can be reduced 50% in caliper, resulting in a less costly metalized OPP layer 78.

Prior art FIG. 13A shows a packaging structure often used containing M & M Mars candy products. It contains layer 81 reverse printed film and layer 82 paper. An improved structure shown in FIG. 13B contains GCC with bonding agent layer 83. Because GCC layer 83 contains all the barrier, printability, and structural attributes necessary for this application, the structure can be reduced from 2 plies to one ply, greatly increasing machine-ability and speed of manufacture. Further, the cost by weight of the single ply structure shown in FIG. 13B is significantly less than 2-ply structure 13. Additionally, the mineral based layer and composite of FIG. 13B is compostable, bio-degradable, photo-degradable, recyclable, sustainable, and during manufacturing emits no water borne or airborne chemicals into the environment and uses less energy and delivers no greenhouse gas ($CO_2$) emissions.

The prior art flexible film structure shown in FIG. 14A is a relatively stiff structure used for Chips Ahoy by Nabisco and includes a tin-tie from Bedford Industries for re-closure. It contains paper layer 84, polyethylene layer 85, foil layer 86, polyethylene layer 87, and sealant layer 88. FIG. 14B shows an improved structure containing GCC with bonding agent layer 89, layer 90 foil, and layer 91 sealant. The improved structure contains 3 plies instead of 5, therefore, greatly reducing cost and increasing manufacturing efficiencies. Because of the barrier characteristics and structure of the GCC containing layer 89, paper layer 84 and polyethylene layer 85 are no longer needed or, if used, could be substantially downgraded in basis weight and caliper.

The prior art flexible film structure shown in FIG. 15A is used for many of the Snack Well's products packaged in unprinted laminated PP layer 92 with an extrusion applied sealant, layer 93. FIG. 17B shows an improved structure containing GCC with bonding agent layer 94 and heat seal coating layer 95. Because GCC and mineral materials are far less expensive than PP, considerable cost savings are possible. Also, PP is not adequately printable in this application without adding costs. If desired, GCC layer 94 can be printed without requiring pre-treatments, coatings, or Corona Treatment.

Figure 16A:
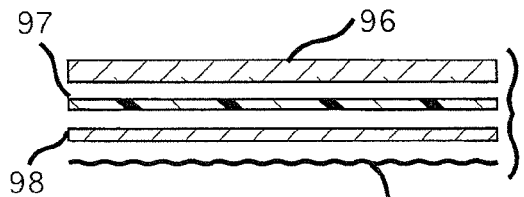
FIG. 16A is a schematic side view of a prior art flexible material structure designed for use as a structure for a number of variations for dry sauces within a carton or for dry soup mixes, typically having one or two color line printing, and also used for the Lipton Tea stand up pouch as well as various dry mixes from McCormick and many others.
Figure 16B:
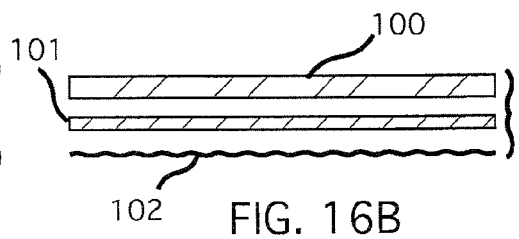
FIG. 16B is a schematic side view of a ground calcium carbonate-containing layer in a flexible composite structure designed for a number of variations for dry sauces within a carton or for dry soup mixes, typically having one or two color line printing, and also used for the Lipton Tea stand up pouch as well as various dry mixes from McCormick and many others, according to aspects of the present invention.

The prior art flexible film structure shown in FIG. 16A is used with a number of variations in the packaging of dry sauces within a carton or for dry soup mixes. It contains paper layer 96, polyethylene layer 97, foil layer 98, and sealant layer 99. An improved flexible film material structure is illustrated in FIG. 16B. It contains GCC with bonding agent layer 100, foil layer 101, and sealant layer 102. The improved structure offers great cost benefits using less plies and not requiring layers 96 or 97. Additional benefits include a brighter, whiter, more opaque printing surface on layer 100 vs. paper layer 96.

Figure 17A:
FIG. 17A is a schematic side view of a prior art flexible material structure designed for use in a structure for greater high quality printing impact at the point of sale, thus, the use of a metalized structure with some improvement in the moisture barrier.
Figure 17B:
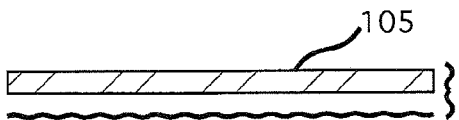
FIG. 17B is a schematic side view of a ground calcium carbonate-containing layer in a flexible composite structure designed for greater high quality printing impact at the point of sale, thus, the use of a metalized structure with some improvement in the moisture barrier, according to aspects of the present invention.

The prior art flexible film structure shown in FIG. 17A is a heat sealable polypropylene material used to package pasta that is not boxed. It can also be used for pouch style structures. It contains OPP layer 103 and optional sealant layer 104. An improved structure in FIG. 17B contains GCC with bonding agent layer 105 and optional sealant layer 106. By using a substantially mineral-containing layer 105 instead of polymer containing layer 104, significant material cost savings result. Also, printability is improved without requiring pre-treatments, coating, or Corona Treatment. Additionally, the mineral based layer 105 is compostable, bio-degradable, photo-degradable, recyclable, sustainable, and during manufacturing emits no water borne or airborne chemicals into the environment as well as using less energy and expelling no greenhouse gas ($CO_2$) emissions.

Figure 18A:
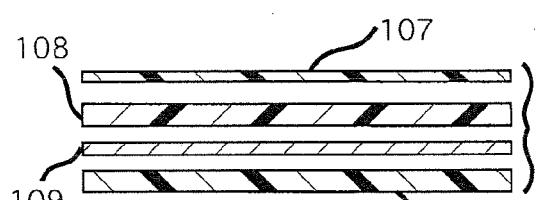
FIG. 18A is a schematic side view of a prior art flexible material structure designed for use in a structure for packaging seafood and is representative of several structures with variations developed recently for the food product market.
Figure 18B:
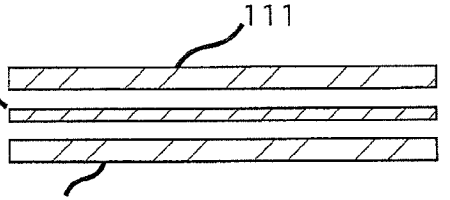
FIG. 18B is a schematic side view of a ground calcium carbonate-containing layer in a flexible composite structure designed for packaging seafood and is representative of several structures with variations developed recently for the food product market, according to aspects of the present invention.

Prior art FIG. 18A shows a flexible film composite structure that is representative of a material used to package fresh and frozen seafood. It contains PET layer 107, Nylon layer 108, foil layer 109, and cast PP layer 110. An improved structure shown in FIG. 18B contains GCC with bonding agent layer 111, metalized foil layer 112, and GCC with bonding agent 113. Although the improved structure includes adding metallization to layer 112, great cost reduction result by substituting the equally performing GCC layers 111 and 113 for the PET layer 107, Nylon layer 108 and cast PP layer 110. Also, much higher printability results over PET layer 107 without the addition of costly pre-treatments, coatings, or Corona Treatment.

Figure 19A:
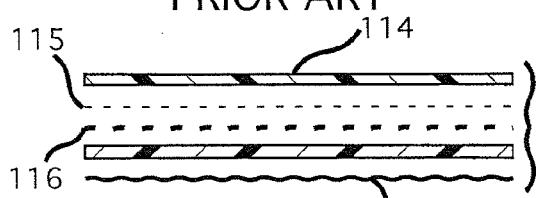
FIG. 19A is a schematic side view of a prior art flexible material structure designed for use in a structure for packaging meat snack products, requiring a good oxygen and moisture barrier and re-closure in the larger size packages.
Figure 19B:
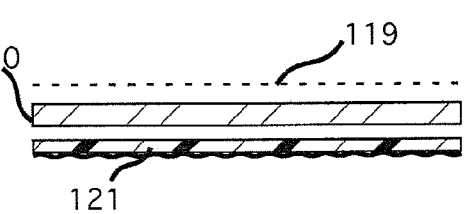
FIG. 19B is a schematic side view of a ground calcium carbonate-containing layer in a flexible composite structure designed for use in a structure for packaging meat snack products requiring a good oxygen and moisture barrier and re-closure in the larger size packages, according to aspects of the present invention.

Prior art FIG. 19A illustrates a representative structure used for meat snack products. It contains PET layer 114, ink layer 115, adhesive layer 116, EVOH layer 117, and sealant layer 118. An improved structure illustrated in FIG. 19B contains an ink layer 119, a GCC with bonding agent layer 120, and EVOH layer with sealant 121. Cost reductions are gained by no longer requiring PET layer 114. Also, higher quality non-reverse printing is possible on the outside of GCC layer 120.

Figure 20A:
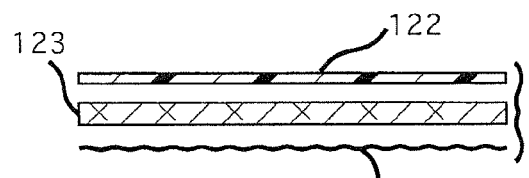
FIG. 20A is a schematic side view of a prior art flexible material structure designed for use in a structure for some rice cake products.
Figure 20B:
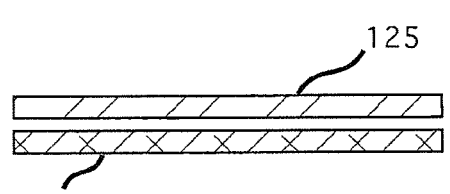
FIG. 20B is a schematic side view of a ground calcium carbonate-containing layer in a flexible composite structure designed for use in a structure for some rice cake products, according to aspects of the present invention.

The structure illustrated in prior art FIG. 20A is representative of multi-wall bag structure that is often used as small and large pet food bags. It contains polyethylene or PET moisture barrier coating layer 122, a paper layer 123, and a heat seal or adhesive seal layer 124. Other structures common to the art might contain more layers of paper or polymers, depending on the requirement or the specific application. Although oxygen and gas barrier properties are not required, pet foods sack and bag packaging often must prevent a combination of moisture and fatty acid penetration or leaching both from the package interior in an outward direction and from an exterior to inward direction. In these cases, multiple layers may contain polyesters or other similar barrier films such as Polychlorotrifluoroethylene. On premium bags and sacks, foil or metalized films might also be used. These films are often combined with layers of fiber that provide stiffness, structure and closure facilitating dead-fold characteristics. In these applications, GCC or other mineral content materials with bonding agents such as HDPE can provide a very cost effective material accomplishing these packaging requirements. FIG. 20B shows an improved flexible film composite comprised of a GCC with bonding agent layer 125 and paper layer 126. Substantial cost reductions result by displacing PET or polyethylene coat layers 122 with GCC layer 125. Also, far better print quality and printability is achieved on the outer surface of GCC layer 125 vs. PET, polyethylene, or paper layers 122 or 123. Additionally, the mineral based layer 125 is compostable, bio-degradable, photo-degradable, recyclable, sustainable, and during manufacturing emits no water borne or airborne chemicals into the environment as well as using less energy and expelling no greenhouse gas ($CO_2$) emissions therefore creating an environmentally advanced composite structure illustrated in FIG. 20B.

Figure 21A:
FIG. 21A is a schematic side view of a prior art flexible material structure designed for use in a structure for as a stand up pouch material used for some of the smaller snack products such as the Quaker Minis.
Figure 21B:
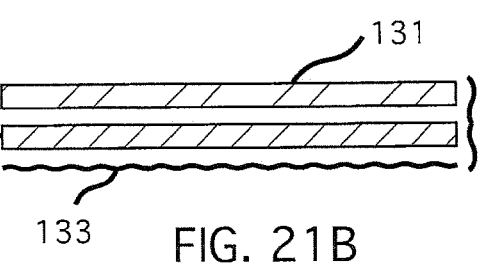
FIG. 21B is a schematic side view of a ground calcium carbonate-containing layer in a flexible composite structure designed for use in a stand up pouch material used for some of the smaller snack products such as the Quaker Minis, according to aspects of the present invention.

FIG. 21A shows a prior art flexible film structure that is used in a stand up pouch material for some smaller snack products such as Quaker Crispy Minis. It contains PET layer 127, Polyethylene layer 128, Metalized OPP layer 129, and sealant layer 130. An improved flexible film structure is illustrated in FIG. 21B that contains GCC with bonding agent layer 131, metalized OPP layer 132, and sealant layer 133. Significant cost advantages in production are gained by reducing the number of layers from 4 (FIG. 21A) to 3 layers in the structure of FIG. 21B. Also, not requiring PET layer 127 and polyethylene layer 128 reduces overall materials costs since mineral layer 131 is far less expensive per ton than polyethylene or PET resins. Further, because of the superior printability of GCC layer 131, the appearance of the packaging at the point of sales is significantly more attractive.

Figure 22A:
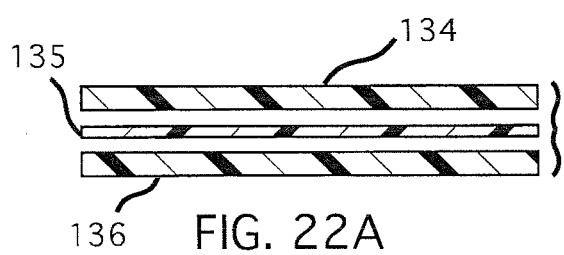
FIG. 22A is a schematic side view of a prior art flexible material structure designed for use as a structure for in a package for products across all lines of salty snacks.
Figure 22B:
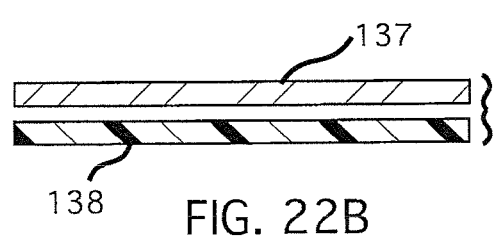
FIG. 22B is a schematic side view of a ground calcium carbonate-containing layer in a flexible composite structure designed for use in a structure for as a package for products across all lines of salty snacks, according to aspects of the present invention.

FIG. 22A is a prior art flexible film structure that is commonly used across all lines of packaging retail products. It contains OPP layer 134, PE layer 135, and OPP layer 136. An improved structure illustrated in FIG. 22B contains GCC with bonding agent layer 137 and OPP layer 138.

Figure 23A:
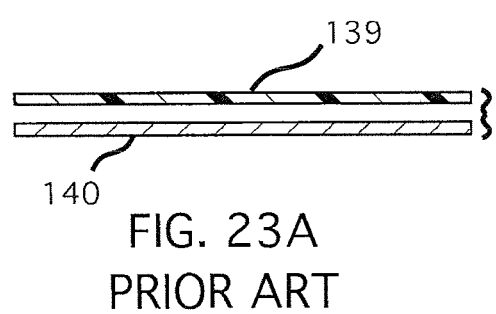
FIG. 23A is a schematic side view of a flexible material structure designed for use in a structure for some nuts in glass of fiber cans but rather for those that are flexible laminates with a typical metalized structure.
Figure 23B:
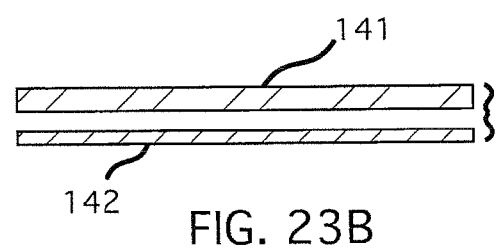
FIG. 23B is a schematic side view of a ground calcium carbonate-containing layer in a flexible composite structure designed for use in a structure for some nuts in glass of fiber cans but rather for those that are flexible laminates with a typical metalized structure, according to aspects of the present invention.

FIG. 23A shows a prior art flexible film structure that is commonly used for packaging nuts. It contains PET layer 139 and layer 140 metalized foil. An improved flexible film structure GCC with bonding agents layer 141 and metalized foil layer 142 is illustrated in FIG. 23B. Significant cost reductions result by substituting the PET layer 139 with GCC layer 141. Also, because of the density and structure of GCC layer 141, the amount of material contained in metalized foil layer 140 can be minimized, further reducing material costs.

In the foregoing embodiments of the invention, it should be understood that when the flexible film composite includes a non-mineral-containing layer, the mineral-containing layer is bonded directly to the non-mineral containing layer, and the mineral-containing layer is fully exposed or substantially exposed to the environment without a sealant layer or other covering material disposed over the mineral-containing layer.

What is claimed is:

1. A flexible film composite suitable for use as a packaging material for storage of articles, comprising:
   at least one mineral-containing layer containing a thermoplastic bonding agent and a mineral material, said mineral containing layer being an external most layer of said flexible film composite, the thermoplastic bonding agent of said mineral-containing layer providing a heat sealable layer of said flexible film composite and an external most layer of said flexible film composite, the thermoplastic bonding agent of said mineral-containing layer providing a heat sealable layer of said flexible film composite and an external surface of said mineral-containing layer providing an external, printable surface of said flexible film composite, said mineral material being selected from the group consisting of ground calcium carbonate, diatomaceous earth, mica, silica, glass, zeolite, slate, and combinations thereof, and at least one layer adhered to said at least one mineral-containing layer by a wet or dry lamination technique, wherein the mineral-containing layer and the at least one other layer form a composite material that is flexible, and wherein the mineral material is present in the mineral-containing layer in an amount of up to 85% by weight, and said at least one other layer comprises a non-mineral containing layer selected from the group consisting of ink, nylon, a sealant, foil, oriented polypropylene (OPP), metalized oriented polypropylene (OPP), polypropylene, polyethylene terephthalate (PET), a peel and stick label backing, polyethylene, ethylene-vinyl alcohol (EVOH), paper, a fiber material coated with polyethylene, a fiber containing layer, a biodegradable polymer, a photodegradable polymer, and a polyester, and wherein said at least one mineral-containing layer is sterilizable.

2. The flexible film composite of claim 1 wherein said at least one mineral containing layer has a dyne level of at least 38.

3. The flexible film composite of claim 1 wherein said bonding agent is selected from high density polyethylene, bio-polymers, polymers, poly-lactic acids, and combinations thereof.

4. The flexible film composite of claim 1 wherein the layers are adhered to each other with a dry lamination technique.

5. The flexible film composite of claim 1 wherein the layers are adhered to each other with a wet lamination technique.

6. The flexible film composite of claim 1 wherein said bonding agent in said at least one mineral-containing layer comprises a thermo-formable bonding agent.

7. The flexible film composite of claim 1 wherein at least one of said mineral-containing layer and said at least one other layer comprises a bio-degradable polymer, whereby said flexible film composite is biodegradable.

8. The flexible film composite of claim 1 wherein at least one of said mineral-containing layer and said at least one other layer comprises a biodegradable polymer, whereby said flexible film composite is compostable.

9. The flexible film composite of claim 1 wherein at least one of said mineral-containing layer and said at least one other layer comprises a photodegradable polymer, whereby said flexible film composite is photo-degradable.

10. The flexible film composite of claim 1 wherein at least one of said mineral-containing layer and said at least one other layer comprises at least one of a biodegradable polymer and a photodegradable polymer, whereby said flexible film composite is recyclable.

11. The flexible film composite of claim 1 wherein said flexible film composite is also static-electricity resistant.

12. The flexible film composite of claim 1 wherein said at least one other layer comprises a fiber-containing layer formed of a paper material selected from the group consisting of bleached kraft virgin, unbleached kraft virgin, recycled board, and combinations thereof.

13. The flexible film composite of claim 1 wherein the flexible film composite is formed into a shipping envelope.

* * * * *